United States Patent [19]

Rose et al.

[11] Patent Number: 5,041,323
[45] Date of Patent: Aug. 20, 1991

[54] HONEYCOMB NOISE ATTENUATION STRUCTURE

[75] Inventors: Philip M. Rose, Chula Vista; Jia Yu, San Diego, both of Calif.

[73] Assignee: Rohr Industries, Inc., Chula Vista, Calif.

[21] Appl. No.: 426,764

[22] Filed: Oct. 26, 1989

[51] Int. Cl.⁵ .............................................. B32B 3/12
[52] U.S. Cl. ..................................... 428/116; 52/806; 181/292; 428/138
[58] Field of Search ............... 428/116, 118, 73, 138; 181/292; 52/806

[56] References Cited

U.S. PATENT DOCUMENTS

| | | | |
|---|---|---|---|
| 3,166,149 | 1/1965 | Hulse et al. | 428/118 X |
| 3,502,171 | 3/1970 | Cowan | 428/116 X |
| 3,640,357 | 2/1972 | Kitching et al. | 428/116 X |
| 3,948,346 | 4/1976 | Schindler | 428/116 X |
| 4,257,998 | 3/1981 | Diepenbrock, Jr. et al. | 428/116 X |
| 4,421,811 | 12/1983 | Rose et al. | 428/116 |
| 4,465,725 | 8/1984 | Riel | 428/116 |

*Primary Examiner*—Henry F. Epstein
*Attorney, Agent, or Firm*—Patrick J. Schlesinger; Frank D. Gilliam

[57] ABSTRACT

A double layer structural honeycomb sandwich noise suppression panel for use in severe environments such as aircraft turbine engine housings. Two honeycomb core sheets having multiple cells transverse to the sheets are sandwiched around and bonded to a septum sheet consisting of a wire cloth sheet alone or bonded to a sheet of perforated material. A thin sheet of impervious material is bonded to one surface of the sandwich and a facing of thin perforated sheet material is bonded to the other sandwich surface. The panel has improved simplicity, structural strength with unusually light weight.

9 Claims, 1 Drawing Sheet

HONEYCOMB NOISE ATTENUATION STRUCTURE

BACKGROUND OF THE INVENTION

1. Field of the Invention

This invention relates in general to structural noise suppression systems particularly adapted to use in aircraft engine housings and, more specifically, to a double layer noise suppression honeycomb sandwich panel.

2. Description of the Prior Art

Since the earliest days of commercial jet aircraft, great efforts have been expended in developing methods and structures for reducing engine noise. Many different sound absorbing linings have been applied to intake bypass ducts, compressor casings and other components in aircraft turbine engine housings.

Early sound absorbing linings and panels used a honeycomb core bonded on one side to an impervious sheet and on the other to various pervious materials, such as perforated sheets, wire cloth or screens, fibrous layers and the like. Typical panels of this sort are described in U.S. Pat. Nos. 3,640,357 and 3,166,149.

In order to improve sound absorption, for some applications multilayer panels were designed, using plural honeycomb sheets separated by perforated sheets, with an impervious sheet on one side and a perforated sheet on the other, as described by Schindler in U.S. Pat. No. 3,948,346.

In further attempts to improve noise suppression, a variety of complex multi-component pervious sheets have been secured to cellular core structures. The previous sheets may include screens, fibrous mats, woven cloth, etc., as described by Cowan in U.S. Pat. No. 3,502,171. Multiple layers of honeycomb core material, perforated sheets and microporous sheets as described by Riel in U.S. Pat. No. 4,465,725 have been developed for specific applications.

U.S. Pat. No. 4,257,998 issued Mar. 24, 1981 teaches a method of making a cellular core with an internal septum. The septum is a perforated non-metallic sheet which in a softened state has the cellular core pressed into it to provide upper and lower core sheets having various predetermined heights.

Many of these designs are quite effective in reducing noise in aircraft engine applications. However, they tend to be complex in design and manufacture, expensive to manufacture, to add considerable undesirable weight to an aircraft and to have less than optimum strength and structural reliability when exposed to the hostile, high air flow environments encountered in engine housings.

Thus, there is a continuing need for effective noise suppression panels of improved simplicity, structural strength and light weight.

SUMMARY OF THE INVENTION

The above-noted problems, and others, are overcome in accordance with this invention by a simple double layer honeycomb sandwich panel in which a first and second honeycomb panels having transverse cells are bonded to opposite sides of a linear microporous septum which may consist, for example, either of a single layer of woven cloth or a bonded composite of woven cloth or other fine porous metal and thin perforated sheet material. A thin sheet of impervious material is bonded to one surface of this sandwich and a thin perforated sheet is bonded to the opposite surface.

This panel is simple in design and manufacture, light in weight, has excellent structural strength in severe, high air flow environments and has surprisingly good sound absorption characteristics that can be designed for various noise reduction requirements.

BRIEF DESCRIPTION OF THE DRAWING

Details of the invention, and of preferred embodiments thereof, will be further understood upon reference to the drawing, wherein.

DETAILED DESCRIPTION OF PREFERRED EMBODIMENTS

Figure 1:
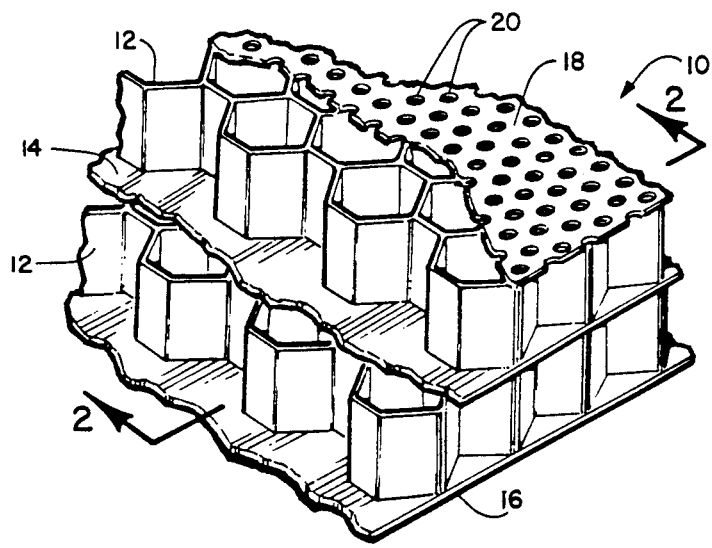
FIG. 1 is a perspective view, partially cut away, of the noise suppression panel of this invention.

Referring now to FIG. 1, there is seen a perspective view, partially cut away, of a noise suppression panel 10 according to this invention.

Panel 10 includes two sheets of honeycomb core material 12 sandwiched around a septum 14. Honeycomb sheets 12 have cells extending transverse to the panel surface and preferably lying approximately 90° to the panel surface. The two sheets 12 can vary in cell size and depth. The honeycomb core sheets may be formed from any suitable material. Typical materials include metals such as aluminum or titanium, Kevlar aramids, phenolics or other plastics, and mixtures and combinations thereof.

Figure 2:
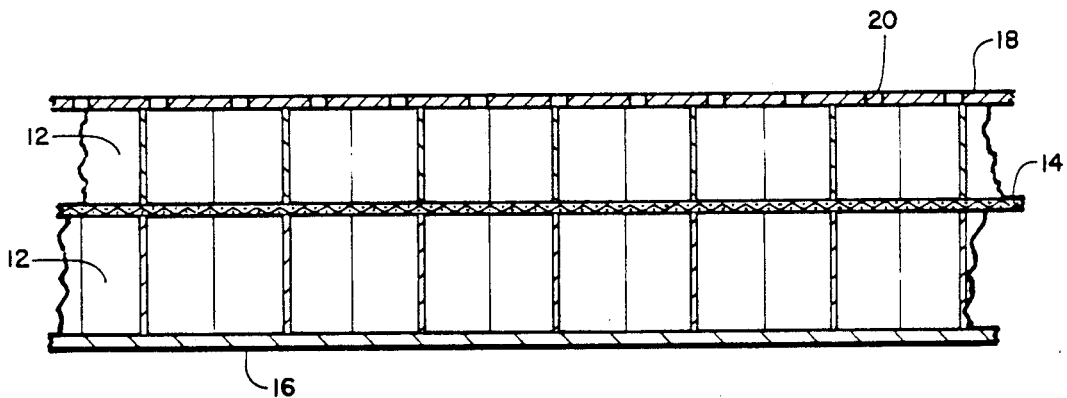
FIG. 2 is a detail vertical section view through the panel of FIG. 1.
Figure 3:
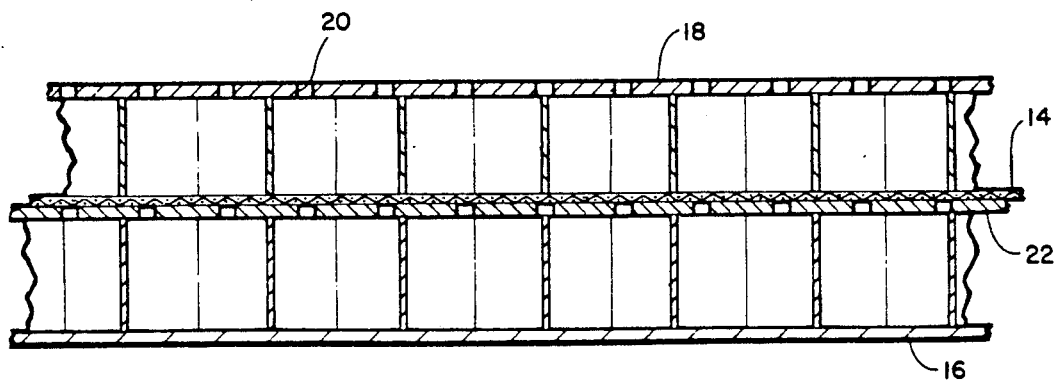
FIG. 3 is a detail section view, similar to that of FIG. 2, showing a second embodiment of the panel.

Septum 14 in the illustrated embodiment has one of two configuration, as shown in FIGS. 2 and 3. The single layer of woven cloth shown in FIGS. 1 and 2 is preferred for simplicity, light weight and noise suppression effectiveness. We have found that adding additional layers have little, if any favorable affect on sound absorption characteristics while significantly increasing panel weight and generally reducing panel structural strength.

The septum 14 preferably has a non-linearity factor ("NLF") of less than 1.5. By way of example, the NLF of the perforated sheet of the noted Shindler U.S. Pat. No. 3,948,346 is 10 and the NLF of the laser drilled septum of U.S. Pat. No. 4,257,998 is 3. To those skilled in the art the non-linearity factor is determined by dividing the Rayl number of a selected perforated sheet at 200 cm./sec. by the Rayl number of that selected perforated sheet at 20 cm./sec. Thus, a more linear material, that is one that has an NLF approaching 1.0, represents a sound attenuation material that has an acoustic impedance which is fairly constant over a range of frequencies. For aircraft propulsion systems this range of frequencies covers those that are encountered at take off, cruise, and landing of an aircraft.

Any suitable woven cloth may be used for septum 14. Typical materials for the woven cloth include stainless steel, aluminum, titanium and mixtures thereof or non-metallic materials. Where septum 14 is a single layer of woven metallic cloth, a stainless steel woven material is preferred for strength, light weight and excellent sound attenuation characteristics. The strand crossover points may be joined by any conventional method, such as sintering, diffusion bonding or the like.

The woven cloth making up septum 14 may have any suitable wire diameter and mesh pattern and number of strands. We have found that for optimum results septum 14 should have a flow resistance of about 60 to 140 Rayls. A Rayl is defined as the ratio of the pressure drop across the porous medium, P, in dynes/cm.2, to the gas flow velocity, u, in cm./sec. Since the Rayl number depends on the air flow rate, a flow rate corresponding to that anticipated to be encountered in the operating environment, e.g. an aircraft engine housing, is used to determine the precise septum to be used to provide the desired flow resistance to give the optimum flow resistance. The flow is related to sound pressure levels in the duct.

Any suitable method may be used to bond septum 14 to the honeycomb core sheets 12 as long as sufficient art is used to maintain acoustic quality. Where both honeycomb cores 12 and septum 14 are compatible materials, sintering or diffusion bonding may also be particularly effective. Otherwise, bonding with a suitable adhesive is preferred. Typical adhesives include low solvent solution sprayable adhesive and adhesive films.

An impervious sheet 16 is bonded to one side of the sandwich and a perforated sheet 18 is bonded to the other surface. Sheet 16 may be formed from any suitable material which is impervious to air flow and is applicable to the harsh environment. Typical materials include metals such as aluminum or titanium, plastics such as phenolics, composites such as fiber reinforced plastics and the like. Perforated facing sheet 18 may be formed from any suitable material. While metals such as aluminum may be preferred, other rigid sheet materials such as high temperature resistant plastics or fiber reinforced composites may be used.

The size, number and spacing of perforations 20 will depend upon the precise acoustic requirement to be encountered. Generally, perforations 20 will range from about 0.030 to 0.100 in diameter, while still maintaining linearity characteristics, will provide from about 15 to 35% open area and will be arranged in a uniform pattern across sheet 18.

FIG. 3 illustrates a second embodiment of this invention. Here, septum 14 includes both a woven wire sheet and a perforated sheet 22. Perforated sheet 22 has characteristics generally similar to those of perforated sheet 18. The sheets making up the two-layer septum 14 of FIG. 3 should be selected to give the flow resistance detailed above. While the embodiment of FIGS. 1 and 2 is preferred for an optimum combination of simplicity, light weight, ease of manufacture and noise suppression effectiveness, in some cases the embodiment of FIG. 3 will be preferred for its somewhat greater strength.

The optimum noise suppression panel in accordance with this invention uses two honeycomb core sheets having thicknesses of about 0.2 inch to 1.5 inch cross dimensions of about 3/8 to 1 inch, a perforated face sheet having about 15–30% open area and a single woven cloth septum having an air flow resistance of about 60–140 Rayls.

It should be understood the suppression panel depicted in FIG. 2 can also be constructed using a single honeycomb core with the septum comprising a plurality of substantially coplanar plugs or septum portions placed in each of the cells intermediate the major surfaces of the honeycomb panel, for example, by the method taught by U.S. Pat. No. 4,257,998 or any other convenient method.

While the invention has been described in detail with respect to the preferred embodiments, it should be understood that suitable changes and modifications may be made within the spirit of this invention as limited only by the scope of the appended claims.

We claim:

1. A double layer noise suppression honeycomb sandwich panel of improved simplicity, high structural strength and light weight for use in severe environments in and around high velocity fluid flow paths and high sonic environments which comprises:
   a first honeycomb core sheet having a multiplicity of cells with walls of thin sheet material, said cells directed transverse to said panel;
   a thin sheet of impervious material bonded to one major surface of said first honeycomb core sheet;
   septum having a pliable non-linearity factor of less than 1.5 bonded to the second major surface of said first honeycomb core sheet;
   a second honeycomb core sheet having a multiplicity of cells with walls of thin sheet material, said cells directed transverse to said panel, said second honeycomb core sheet bonded to said septum; and
   a facing of perforated sheet material bonded to the free surface of said second core sheet.

2. The noise suppression panel according to claim 1 wherein the air flow resistance of said septum is from about 60 to 140 Rayls.

3. The noise suppression panel according to claim 1 wherein said septum is a wire cloth.

4. The noise suppression panel according to claim 3 wherein said septum further includes a perforated sheet bonded to said wire cloth and one of said honeycomb core sheets.

5. The noise suppression panel according to claim 1 wherein said perforations cover from about 15 to 30 percent of the surface area of said perforated face sheet.

6. An effective noise suppression panel having improved simplicity, high structural strength and light weight for use in aircraft turbine engine housings which comprises:
   a sandwich structure consisting of a pair of honeycomb core sheets bonded to opposite sides of a sheet septum having a non-linearity factor of less than 1.5 with the honeycomb cells extending transverse to said sandwich; the air flow resistance of said septum being about 70–120 Rayls; thin sheet of impervious material bonded to one major surface of said sandwich and a thin sheet of perforated material bonded to the second major surface of said sandwich, said perforations covering about 15–30% of the surface area of said perforated sheet.

7. The noise suppression panel according to claim 6 wherein said septum is a wire cloth.

8. The noise suppression panel according to claim 6 wherein said septum further includes a perforated sheet bonded to said wire cloth and one of said honeycomb core sheets.

9. A noise suppression honeycomb sandwich panel of improved simplicity, high structural strength and light weight for use in severe environments in and around high velocity fluid flow paths and high sonic environments which comprises:
   a honeycomb core sheet having a multiplicity of cells with walls of thin sheet material, said cells directed transverse to said panel;
   a thin sheet of impervious material bonded to one major surface of said honeycomb core sheet;
   a septum having a non-linearity factor of less than 1.5, said septum comprising plurality of co-planar portions being positioned within each of said multiplicity of cells intermediate the major surfaces and bonded thereto; and
   a facing of perforated sheet material bonded to the free surface of said honeycomb core sheet.

* * * * *